Patented Dec. 8, 1953

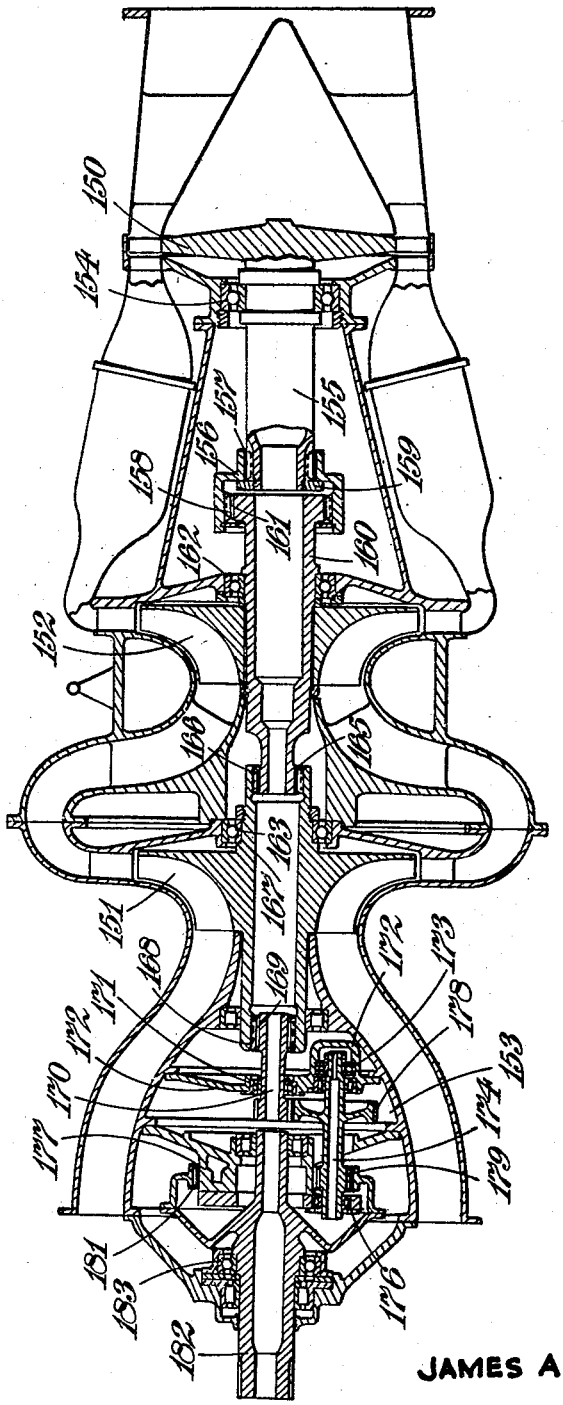

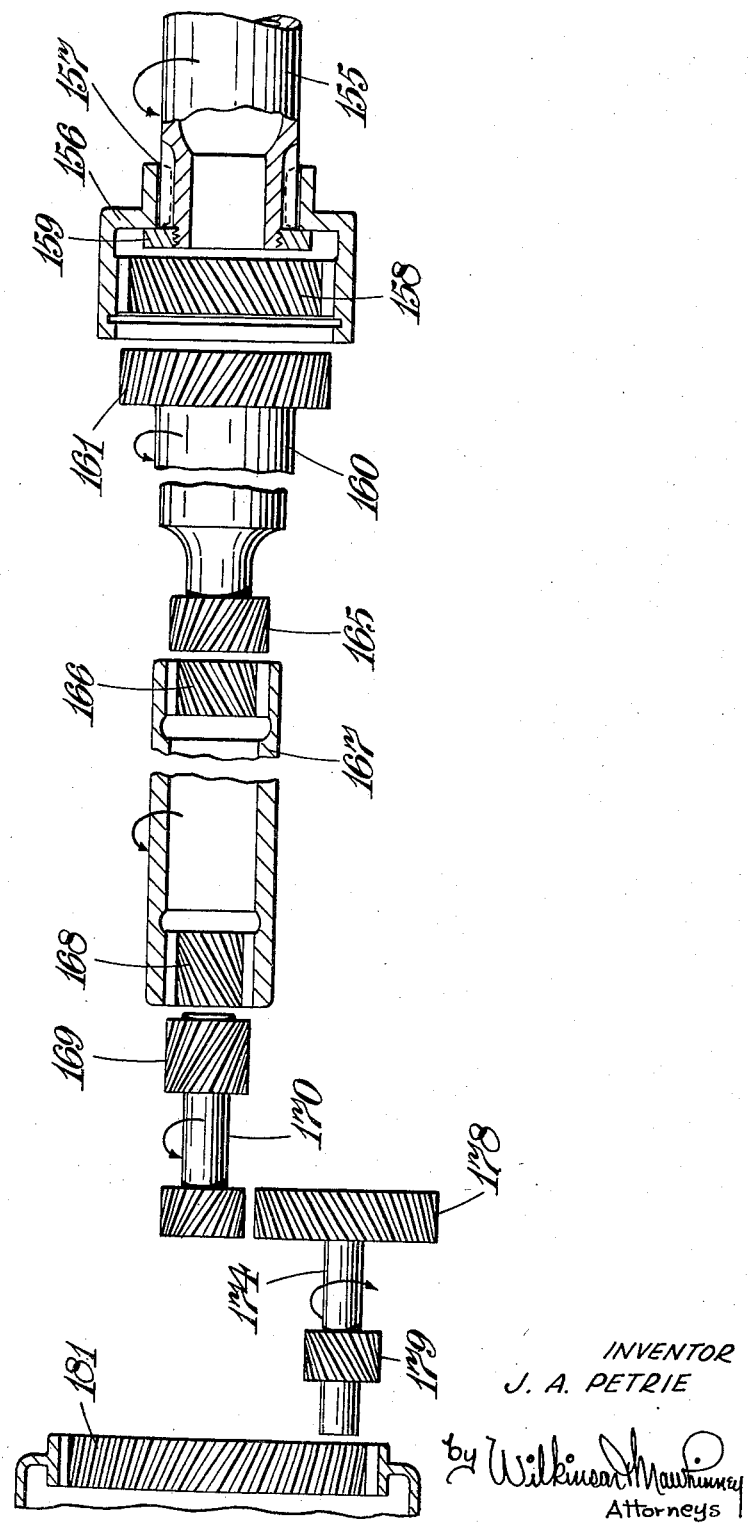

2,661,594

UNITED STATES PATENT OFFICE 2,661,594

COAXIAL COMBUSTION PRODUCTS GENERATOR, TURBINE, AND COMPRESSORS

James Alexander Petrie, Littleover, England, assignor to Rolls-Royce Limited, Derby, England, a British company Original application October 20, 1949, Serial No. 122,440, now Patent No. 2,625,790, dated January 20, 1953. Divided and this application August 11, 1952, Serial No. 303,703

Claims priority, application Great Britain October 28, 1948

2 Claims. (Cl. 60—39.37)

This application is divided out of my copending application Serial No. 122,440 filed October 20, 1949, now Patent No. 2,625,790.

The invention relates to fluid machine assemblies of the kind having a plurality of rotors mounted each on its own rotor shaft and each developing, when operating on or driven by the working fluid, an axial thrust which is related to the torque transmitted by its shaft.

Examples of such rotary fluid machines include turbines, compressors, fans and fluid screws. Thus some axial flow turbines, when producing torque by the passage of fluid through their rotor blading, also have an axial thrust generated on the rotor disc or drum which is approximately proportional to the torque. Likewise, in the case of an axial flow compressor, fan or fluid screw, the absorption of power thereby may be accompanied by an axial thrust on the rotor which again may be approximately proportional to the driving torque. In the case of single-sided radial flow machines a similar thrust may arise due to unbalance of pressure loadings on the two sides of the rotor. For example, in the case of a radial flow turbine or a single-sided centrifugal compressor the fluid pressure loading will differ as between the side of the rotor carrying moving blading or vanes and that which is subjected either to static inlet, exhaust or ambient pressure.

The object of the invention is to provide novel constructions of gas-turbine engines in which the various rotors can be independently located axially.

The invention may be more readily appreciated from the following description of a gas-turbine engine which embodies the invention, reference being had to the accompanying drawing in which:

Figure 1 illustrates the gas-turbine engine partly in section, and

Figure 2 is an exploded view of the shaft and gear connections with parts broken, with parts in section and with parts in elevation.

In the drawing, a turbine 150 drives two centrifugal compressors 151, 152 which are coaxially arranged with the turbine 150 and in addition the turbine 150 drives an airscrew through a reduction gear generally indicated by the reference numeral 153. Air enters the first compressor 151 in which it is compressed and from which it is delivered to the entry of the second compressor 152. From the delivery of the second compressor 152 it passes after heating to the turbine 150.

It is desirable that the two compressors 151, 152, and the turbine 150 should be located independently of one another. To this end the turbine shaft 155 which is located by a thrust bearing 154 has a sleeve 156 engaged therewith by normal splines 157 and the sleeve has internal helical splines 158 at the end remote from the turbine shaft; the sleeve 156 is held in engagement with the turbine shaft by a nut 159. The high pressure compressor shaft 160 has formed, at the end thereof adjacent to the turbine, external helical splines 161 which mesh with the internal splines 158 formed on the sleeve 156, the sense and angle of the helix are chosen so that the lead of the helical splines 158 is in the same sense as the direction of rotation, i. e. so that the shaft 160 and sleeve 156 tend to be drawn together in operation and the thrust generated as a result of the transmission of torque through the helical splines 158, 161 and transmitted to the turbine shaft through the nut 159 at least partially cancels out the out-of-balance thrust of the turbine, and the thrust transmitted to the high pressure compressor shaft 160 opposes the thrust due to the rotor of the compressor 152. The high pressure compressor shaft is located by a thrust bearing 162. The end of the high pressure compressor shaft 160 remote from the turbine is formed with external helical splines 165 of which the lead is in the same sense as the direction of rotation and which engage with co-operating internal helical splines 166 at the rear end of the low pressure compressor shaft 167. Thus the two compressor shafts 160 and 167 tend to be drawn together in operation and a rearward thrust is produced in the low pressure compressor shaft 167 as a result of the transmission of torque through the helical splines 165, 166 which opposes the thrust due to the rotor of the compressor 151. The low pressure compressor shaft is located by a thrust bearing 163.

The forward end of the low pressure compressor shaft 167 is formed with another set of internal helical splines 168 of which the lead is in the same sense as the direction of rotation and which mesh with a co-operating set of external splines 169 on an intermediate drive shaft 170, so that the shaft 167 and the shaft 170 tend to be drawn together in operation. This intermediate drive shaft 170 is located by a thrust bearing 171 carried by a diaphragm 172. The same diaphragm 172 supports the rear bearing 173 which locates a layshaft 174 of the reduction gear 153. A roller bearing 176 supported by a second diaphragm 177 carries the front end of the layshaft 174.

Two reduction gear pinions 178, 179 are mounted on the layshaft 174 to rotate therewith and the drive is transmitted from the intermediate shaft 170 to the rear layshaft pinion 178 which has helical teeth, of which the lead is in the opposite sense to the direction of rotation of the layshaft 174 so as to produce a forward thrust in the intermediate shaft 170 and a rearward thrust in the layshaft pinion 178 which tends to draw the pinion 178 and the shaft 170 together. The second layshaft pinion 179 meshes with an internal annular gear 181 carried by the airscrew shaft 182, the latter being located by a thrust bearing 183 supported in the reduction gear housing. The second layshaft pinion 179 and the annular gear 181 also have helical teeth, the lead of the teeth on the pinion 179 being in the same sense as the direction of rotation of the layshaft 174 so as to produce a forward thrust in the layshaft 174, thus tending to draw the layshaft 178 and the gear 181 together and to balance the rearward thrust in the layshaft due to the first pinion 178 and enabling the locating bearing 173 to be of reduced capacity. The rearward thrust produced in the annular gear 181 opposes the thrust in the airscrew shaft 182 due to the airscrew and thus permits an airscrew shaft thrust locating bearing 183 of reduced capacity to be used.

It will be seen that by appropriate selection of the helix angle, the reactions produced by the helices in their respective shafts may be arranged so that the loads in such shafts are substantially balanced, so that small capacity thrust bearings may be used.

It will be appreciated that in the interconnection of turbine and compressor or fluid screw systems in accordance with the invention, the thrust arising on the systems in operation is approximately proportional to the torque transmitted thereto or therefrom, and consequently throughout the designed range of running, the degree of balance afforded by the adoption of the invention will be maintained irrespective of the power transmitted.

The invention further permits the independent axial location of the various items of the assembly, which is of importance, in order to maintain efficiency of operation of these items, particularly in the case of axial flow compressors and turbines.

I claim:

1. A gas-turbine engine comprising a first compressor casing having an inlet and outlet; a first compressor rotor in said first compressor casing and on which when in operation, a first axial load is generated; a first compressor shaft on which said first compressor rotor is mounted for rotation therewith and to which said first axial load is transmitted; a second compressor casing having an inlet and an outlet; ducting from the outlet of said first compressor casing to the inlet of said second compressor casing, a second compressor rotor in said second compressor casing coaxial with said first compressor rotor and on which, when in operation, a second axial load in the same direction as said first axial load is generated; a second compressor shaft on which said second compressor rotor is mounted for rotation therewith and to which said second axial load is transmitted; a turbine casing having an inlet and an outlet; ducting from the outlet of said second compressor casing to the inlet of said turbine casing and including heating means; a turbine rotor in said turbine casing, coaxial with said first and second compressor rotors and on which when in operation a third axial load in the opposite direction to said first and second axial loads is generated; a turbine shaft on which said turbine rotor is mounted for rotation therewith and to which said third axial load is transmitted; a first pair of sets of interengaging helical splines, the one on said second compressor shaft and the other on said turbine shaft, whereby torque can be transmitted from said turbine shaft to said second compressor shaft and whereof the helix lead on said turbine shaft is in the same sense as the direction of rotation so that when torque is so transmitted a fourth axial load is generated in said turbine shaft opposing said third axial load and so that a fifth axial load is generated in said second compressor shaft opposing said second axial load; a second pair of sets of interengaging helical splines, the one on said first compressor shaft and the other on said second compressor shaft, whereby torque can be transmitted from said second compressor shaft to said first compressor shaft and whereof the helix lead on said second compressor shaft is in the same sense as the direction of rotation so that when torque is so transmitted a sixth axial load is generated in said first compressor shaft opposing said first axial load; a first locating thrust bearing for said first compressor shaft; a second locating thrust bearing for said second compressor shaft; and a third locating thrust bearing for said turbine shaft.

2. A gas-turbine engine as claimed in claim 1 and further comprising a fluidscrew on which, when in operation, a seventh axial load is generated in the same direction as said first axial load; a fluidscrew shaft on which said fluidscrew is mounted for rotation therewith and to which said seventh axial load is transmitted; an intermediate drive shaft; a third pair of sets of helical splines, the one on said first compressor shaft and the other on said intermediate drive shaft, whereby torque can be transmitted from said first compressor shaft to said intermediate drive shaft and whereof the helix lead on said first compressor shaft is in the same sense as the direction of rotation so that, when torque is so transmitted, an eighth axial load is generated in said first compressor rotor shaft opposing said sixth axial load and a ninth axial load is generated in said intermediate drive shaft; a helical toothed pinion on said intermediate drive shaft; a lay shaft; a first helical toothed gear wheel on said layshaft meshing with said helical toothed pinion, whereby torque can be transmitted from said intermediate drive shaft to said lay shaft and whereof the helix lead of said pinion is in the same sense as the direction of rotation so that when torque is so transmitted a tenth axial load is generated in said intermediate drive shaft opposed to said ninth axial load and an eleventh axial load is generated in said lay shaft; a second helical toothed gear wheel on said lay shaft; a helical toothed annulus on said fluidscrew shaft meshing with said second helical toothed gear wheel whereby torque can be transmitted from said layshaft to said fluidscrew shaft and whereof the helix lead of said second gear is in the same sense as the direction of rotation so that when torque is so transmitted, a twelfth axial load is generated in said lay shaft opposed to said eleventh axial load and a thirteenth axial load is generated in said fluidscrew shaft opposed to said seventh axial load; the helical toothed pinion, helical toothed gear wheels and helical toothed annulus being so relatively dimensioned that they constitute a reduction gear train; a fourth locating thrust bearing for said fluidscrew shaft; a fifth locating thrust bearing for said lay shaft, and a sixth locating thrust bearing for said intermediate drive shaft.

JAMES ALEXANDER PETRIE.

References Cited in the file of this patent

UNITED STATES PATENTS

| Number | Name | Date |
|---|---|---|
| 2,375,006 | Larrecq | May 1, 1945 |
| 2,583,872 | Newcomb | Jan. 29, 1952 |